April 14, 1936.   P. E. MATTHEWS   2,037,173
LUBRICATION SYSTEM FOR REAR AXLE DIFFERENTIAL BEARINGS
Filed July 20, 1935
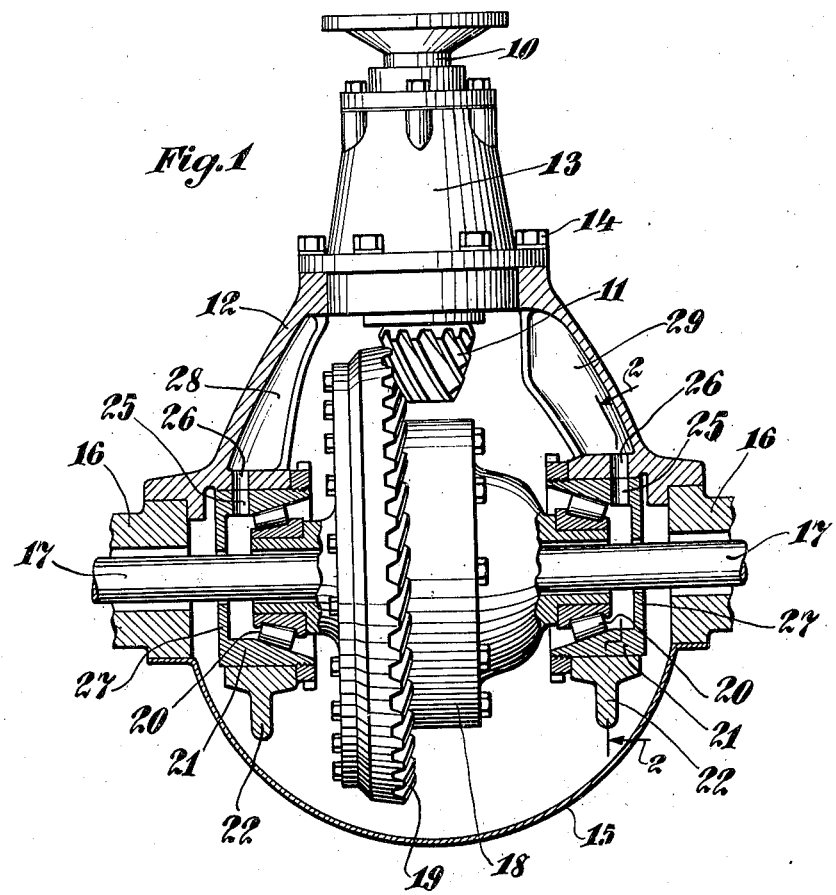
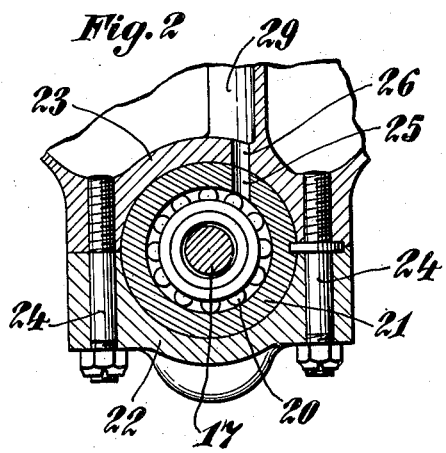
INVENTOR.
Philip E. Matthews,
BY
HIS ATTORNEYS Patented Apr. 14, 1936

2,037,173

UNITED STATES PATENT OFFICE 2,037,173

LUBRICATION SYSTEM FOR REAR AXLE DIFFERENTIAL BEARINGS

Philip E. Matthews, Plainfield, N. J., assignor to International Motor Company, New York, N. Y., a corporation of Delaware Application July 20, 1935, Serial No. 32,362

1 Claim. (Cl. 184—11)

The present invention relates to lubrication systems and embodies, more specifically, an improved lubricating system which is particularly adaptable for lubricating bearings adjacent to which, or between which, a rotating element is carried, the rotation of the element being utilized as a means for supplying lubricant to the bearings.

More particularly, the invention relates to lubrication systems for use in connection with tapered roller bearings, quite commonly found in differential mechanisms. It has been found, in conventional designs, that the bearings of differentials are inadequately lubricated. This is particularly true where tapered roller bearings are used inasmuch as this type of bearing has an inherent pumping action which is characteristic thereof. Any oil reaching the large tapered end of the bearing cups is immediately expelled by the rollers and it has been found that the inner or small end of the tapered bearing is starved and frequently is quite dry. This obviously results in overheating of the bearing and substantial shortening of the life thereof.

In accordance with the present invention, it is proposed to provide a lubrication system by means of which bearings of the above type may be effectively lubricated, regardless of the amount of lubricant within the housing, and regardless of the type of bearing and inherent pumping action thereof.

A further object of the invention is to provide a structure by means of which lubricant from a rotating part may be collected and supplied effectively to a bearing in order that the latter may be adequately lubricated under all conditions of operation.

A further object of the invention is to provide a mechanism of the above character wherein, in combination with a bearing having an inherent pumping action, the lubrication of the bearing is so effective that the pumping action of the bearing is utilized to draw lubricant therethrough, thus insuring adequate lubrication of the bearing and preventing substantial leakage of the lubricant.

Further objects of the invention will be apparent as it is described in further detail in connection with the accompanying drawing, wherein Figure 1 is a plan view, partly broken away and in section, taken in a horizontal plane on a line passing through the axis of a differential provided with a lubricating mechanism constructed in accordance with the present invention; and Figure 2 is a view in section taken on the line 2—2 of Figure 1 and looking in the direction of the arrows.

With reference to the above drawing, the invention is shown as embodied in a differential mechanism to which power is supplied by a shaft section 10 having a driving pinion 11 within a housing 12. The drive shaft may be mounted in a drive shaft housing 13 which is secured to one end of the housing 12 by means of suitable bolts 14, and the housing 12 may be closed by means of a cover 15. The adjacent ends of jack shaft housings 16 are received within the housing and thus serve as an enclosure for the jack shaft 17.

A differential mechanism is shown at 18 and carries a ring gear 19 which is engaged and driven by the pinion 11.

The differential 18 is journaled in bearings 20 which are shown as of the tapered roller bearing type, the outer races 21 of which are secured to the housing 12 by means of brackets 22. These brackets cooperate with and are secured to bearing-mounting portions 23 by means of bolts 24, the outer races 21 and the mounting portions 23 having ducts 25 and 26 formed therein respectively, the ducts 25 and 26 being adapted to be alined in order that the lubricant may be directed to the small ends of the tapered bearings 20. The outer races 21 may be formed with flanges 27 in order to prevent the escape of lubricant from the bearings and thus insure a supply of lubricant to the inner ends of the tapered bearings.

Upon the sides of the housing 12, shelves 28 and 29 are formed, the forming thereof being such as to provide a means for collecting lubricant which is splashed by the ring gear 19 and directing the same to the ducts 26. As a result, rotation of the ring gear 19 picks up the lubricant from adjacent the bottom of the housing and causes the same to be splashed into the shelves 28 and 29 from which it flows through the ducts 26 and 25 into the bearings 20. Inasmuch as the pumping action of the bearings is in a direction toward the larger end of the taper, the lubricant will be drawn through the bearings and onto the differential mechanisms located centrally thereof.

Obviously, the invention is not limited to any particular form of differential such as shown, but may be applied to any mechanism wherein a rotating part is adapted to pick up and throw or splash lubricant. While the inventon has been described in connection with the construction shown in the accompanying drawing, it is not to be limited save as defined in the appended claim.

I claim:

In combination with a rotatable member and bearings therefor upon opposite sides thereof, the bearings having inner and outer races and being of the tapered roller type having their greatest tapered section adjacent the rotatable member, a housing for the member, brackets at the opposite sides of the housing having cylindrical portions to mount the outer races, shelves upon opposite sides of the housing, and ducts in the cylindrical portions and outer races between the shelves and the respective bearings, the ducts communicating with the outer ends of the bearings, and flanges upon the outer ends of the outer races extending inwardly adjacent the rotatable member to prevent leakage of oil from the bearings.

PHILIP E. MATTHEWS.